US010133557B1

(12) United States Patent
Tripathi et al.

(10) Patent No.: US 10,133,557 B1
(45) Date of Patent: Nov. 20, 2018

(54) MODIFYING CODE TO REDUCE REDUNDANT OR UNNECESSARY POWER USAGE

(71) Applicant: Calypto Design Systems, Inc., San Jose, CA (US)

(72) Inventors: Nikhil Tripathi, Noida (IN); Srihari Yechangunja, Bangalore (IN); Mohit Kumar, Mawana (IN)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/154,029

(22) Filed: Jan. 13, 2014

Related U.S. Application Data

(60) Provisional application No. 61/751,266, filed on Jan. 11, 2013.

(51) Int. Cl.
*G06F 9/30* (2018.01)
*G06F 9/44* (2018.01)
(Continued)

(52) U.S. Cl.
CPC ............ *G06F 8/30* (2013.01); *G06F 8/41* (2013.01); *G06F 8/70* (2013.01); *G06F 8/20* (2013.01);
(Continued)

(58) Field of Classification Search
CPC . G06F 8/65; G06F 8/443; G06F 8/452; G06F 8/4432; G06F 11/3452;
(Continued)

(56) References Cited

U.S. PATENT DOCUMENTS 5,682,320 A * 10/1997 Khouja ............... G06F 17/5022
716/103
6,442,701 B1 * 8/2002 Hurd ..................... G06F 1/3203
713/324
(Continued)

OTHER PUBLICATIONS

Selim Gurun et al., Energy consumption and conservation in mobile peer-to-peer systems, Jul. 25, 2006, [Retrieved on Jun. 19, 2018]. Retrieved from the internet: <URL: https://dl.acm.org/citation.cfm?id=1161258> 6 Pages (18-23) (Year: 2006).*
(Continued)

*Primary Examiner* — Anibal Rivera
(74) *Attorney, Agent, or Firm* — Mentor Graphics Corporation

(57) ABSTRACT

Disclosed herein are representative embodiments of methods, apparatus, and systems for analyzing and/or transforming code (typically, source code) to reduce or avoid redundant or unnecessary power usage (e.g., power cycling, resource leak bugs, and/or unnecessarily repeated activity) in the device that will ultimately execute the application defined by the source code. The disclosed methods can be implemented by a software tool (e.g., a static program analysis tool or EDA analysis tool) that analyzes and/or transforms source code for a software application to help improve the performance of the software application on the target device. The disclosed methods, apparatus, and systems should not be construed as limiting in any way.

25 Claims, 13 Drawing Sheets

(51) Int. Cl.
*G06F 9/38* (2018.01)
*G06F 17/50* (2006.01)
*G06F 8/30* (2018.01)
*G06F 8/70* (2018.01)
*G06F 8/41* (2018.01)
*G06F 8/53* (2018.01)
*G06F 11/36* (2006.01)
*G06F 11/34* (2006.01)
*G06F 8/20* (2018.01)

(52) U.S. Cl.
CPC .............. *G06F 8/443* (2013.01); *G06F 8/53* (2013.01); *G06F 11/3447* (2013.01); *G06F 11/366* (2013.01); *G06F 11/3688* (2013.01); *G06F 17/505* (2013.01); *G06F 17/5022* (2013.01)

(58) Field of Classification Search
CPC .............. G06F 11/302; G06F 11/3062; G06F 11/3624; G06F 11/3466; G06F 11/3409; G06F 17/505; G06F 17/5022; G06F 17/5045; G06F 17/5081; G06F 9/526; G06F 21/558; G06F 11/1084; G06F 11/203; G06F 11/2033; G06F 11/2035; G06F 11/2046; G06F 8/51; G06F 8/447; G06F 8/10; G06F 8/20; G06F 8/456; G06F 8/4441; G06F 11/0793; G06F 11/32; G06F 11/008; G06F 11/3419; G06F 11/36; G06F 9/4435; G06F 9/5044; G06F 9/44505; G06F 9/5072; G06F 9/30174; G06F 9/46; G06F 9/467; G06F 9/5016; G06F 17/5068; G06F 11/3688; G06F 8/41; G06F 8/70; G06F 8/4434; G06F 8/433; G06F 8/53; G06F 8/74; G06F 17/5036; G06F 17/5031; G06F 11/3447; G06F 11/3017; G06F 11/3604; G06F 11/366; G06F 11/362; G06F 11/0748; G06F 11/073; H04L 9/003
See application file for complete search history.

(56) References Cited

U.S. PATENT DOCUMENTS

| | | | | | |
|---|---|---|---|---|---|
| 6,557,107 | B1* | 4/2003 | Kim | ...................... | G06F 1/3228 327/544 |
| 6,865,526 | B1* | 3/2005 | Henkel | ................ | G06F 17/5022 703/18 |
| 6,988,183 | B1* | 1/2006 | Wong | ................. | G06F 9/30174 712/208 |
| 7,076,775 | B2* | 7/2006 | Webster | ..................... | G06F 1/32 713/320 |
| 7,185,215 | B2* | 2/2007 | Cook | ..................... | G06F 8/4432 713/320 |
| 7,234,126 | B2* | 6/2007 | Catthoor | ............. | G06F 17/5045 716/104 |
| 7,366,997 | B1* | 4/2008 | Rahmat | ............... | G06F 17/5036 716/111 |
| 7,404,182 | B1* | 7/2008 | Garthwaite | ......... | G06F 12/0269 707/999.202 |
| 7,483,823 | B2* | 1/2009 | Alfieri | ................. | G06F 17/5045 703/14 |
| 7,499,985 | B2* | 3/2009 | Linjama | ............. | G06K 7/10207 709/220 |
| 7,565,631 | B1* | 7/2009 | Banerjee | ............. | G06F 17/5045 716/103 |
| 8,010,957 | B2* | 8/2011 | O'Brien | .................. | G06F 8/443 717/160 |
| 8,020,153 | B2* | 9/2011 | Aoshima | ............. | G06F 11/3688 717/126 |
| 8,060,869 | B1* | 11/2011 | Panchenko | ............... | G06F 8/44 711/3 |
| 8,156,350 | B2* | 4/2012 | Freitas | ................. | G06F 1/3215 713/300 |
| 8,201,121 | B1* | 6/2012 | Sankaralingam | ... | G06F 17/5045 716/109 |
| 8,448,140 | B2* | 5/2013 | Isshiki | ................ | G06F 11/3419 717/124 |
| 8,527,223 | B2* | 9/2013 | AbuAli | ................. | G06Q 10/06 702/61 |
| 8,589,875 | B2* | 11/2013 | Brenneman | ............... | G06F 8/20 717/120 |
| 8,707,140 | B2* | 4/2014 | Guo | ...................... | H04L 1/0057 714/52 |
| 8,732,669 | B2* | 5/2014 | Valdiviezo Basauri | .. | G06F 8/41 717/104 |
| 8,799,693 | B2* | 8/2014 | Vick | ......................... | G06F 1/32 713/320 |
| 9,189,216 | B2* | 11/2015 | Yamamoto | ............ | G06F 11/302 |
| 2002/0059567 | A1* | 5/2002 | Minamide | ................. | G06F 8/51 717/151 |
| 2002/0100031 | A1* | 7/2002 | Miranda | ................. | G06F 8/443 717/152 |
| 2003/0014742 | A1* | 1/2003 | Seth | ........................ | G06F 8/443 717/158 |
| 2003/0188205 | A1* | 10/2003 | Mylly | ..................... | G06F 1/266 713/300 |
| 2003/0191791 | A1* | 10/2003 | Cyran | ................. | G06F 11/3017 718/100 |
| 2004/0002845 | A1* | 1/2004 | Akiba | ................ | G06F 17/5022 703/14 |
| 2004/0019762 | A1* | 1/2004 | Fukuoka | ............. | G06F 12/1027 711/203 |
| 2004/0031007 | A1* | 2/2004 | Hirakimoto | ......... | G06F 17/5036 716/113 |
| 2004/0111708 | A1* | 6/2004 | Calder | ................ | G06F 11/3447 717/131 |
| 2005/0039156 | A1* | 2/2005 | Catthoor | ............... | G06F 17/505 716/102 |
| 2005/0071825 | A1* | 3/2005 | Nagaraj | ................. | G06F 8/443 717/142 |
| 2005/0114850 | A1* | 5/2005 | Chheda | ................ | G06F 8/4432 717/151 |
| 2005/0166195 | A1* | 7/2005 | Kawahito | ............... | G06F 8/443 717/154 |
| 2005/0204316 | A1* | 9/2005 | Nebel | ................ | G06F 17/5022 716/103 |
| 2005/0262369 | A1* | 11/2005 | Fujioka | ................. | G06F 1/3203 713/324 |
| 2006/0053246 | A1* | 3/2006 | Lee | ........................ | G06F 9/4403 711/100 |
| 2006/0195822 | A1* | 8/2006 | Beardslee | ........ | G01R 31/31705 717/124 |
| 2006/0206885 | A1* | 9/2006 | Seidman | ............... | G06F 11/073 717/148 |
| 2007/0022395 | A1* | 1/2007 | Ravi | ................... | G06F 17/5022 716/104 |
| 2007/0050603 | A1* | 3/2007 | Vorbach | ............... | G06F 9/30181 712/221 |
| 2007/0067056 | A1* | 3/2007 | Nishinohara | .... | G05B 19/41885 700/97 |
| 2007/0079297 | A1* | 4/2007 | Wezelenburg | .......... | G06F 8/443 717/140 |
| 2007/0157044 | A1* | 7/2007 | You | ....................... | G06F 1/3203 713/320 |
| 2007/0198971 | A1* | 8/2007 | Dasu | .................... | G06F 8/433 717/140 |
| 2007/0226717 | A1* | 9/2007 | Shtilman | ............. | G06F 8/443 717/151 |
| 2007/0234052 | A1* | 10/2007 | Campisi | ................ | E05B 67/00 713/169 |
| 2007/0271418 | A1* | 11/2007 | Sridharan | .......... | G06F 11/0748 711/146 |
| 2007/0300214 | A1* | 12/2007 | Chang | ................. | G06F 8/4432 717/153 |

(56) References Cited

U.S. PATENT DOCUMENTS

| | | | | |
|---|---|---|---|---|
| 2008/0034236 A1* | 2/2008 | Takayama | G06F 1/3203 | 713/322 |
| 2008/0077838 A1* | 3/2008 | Hsu | H04L 1/1848 | 714/748 |
| 2008/0256518 A1* | 10/2008 | Aoshima | G06F 11/3688 | 717/127 |
| 2008/0282100 A1* | 11/2008 | Chen | G06F 1/3203 | 713/322 |
| 2009/0013301 A1* | 1/2009 | Ogilvie | G06F 17/5045 | 716/104 |
| 2009/0037687 A1* | 2/2009 | Li | G06F 11/366 | 711/173 |
| 2009/0064118 A1* | 3/2009 | Raber | G06F 8/53 | 717/159 |
| 2009/0113404 A1* | 4/2009 | Takayama | G06F 8/452 | 717/149 |
| 2009/0216910 A1* | 8/2009 | Duchesneau | G06F 9/5072 | 709/250 |
| 2009/0228874 A1* | 9/2009 | Lambrechts | G06F 8/4432 | 717/146 |
| 2009/0276857 A1* | 11/2009 | Harkness | G06F 21/14 | 726/26 |
| 2010/0031238 A1* | 2/2010 | Li | G06F 11/3604 | 717/124 |
| 2010/0100337 A1* | 4/2010 | Vichare | G06F 11/008 | 702/34 |
| 2010/0153654 A1* | 6/2010 | Vorbach | G06F 12/0862 | 711/137 |
| 2010/0185833 A1* | 7/2010 | Saito | G06F 1/3203 | 712/203 |
| 2010/0191929 A1* | 7/2010 | Rawson, III | G06F 1/3203 | 711/170 |
| 2010/0205578 A1* | 8/2010 | Barness | G06F 8/4432 | 717/100 |
| 2010/0205591 A1* | 8/2010 | Barsness | G06F 8/4432 | 717/158 |
| 2010/0293401 A1* | 11/2010 | de Cesare | G06F 1/3228 | 713/320 |
| 2011/0087908 A1* | 4/2011 | Færevaag | G06F 1/3203 | 713/322 |
| 2011/0107297 A1* | 5/2011 | Chandra | G06F 8/433 | 717/110 |
| 2011/0145799 A1* | 6/2011 | Bartolomeo | G06F 11/3604 | 717/132 |
| 2011/0154309 A1* | 6/2011 | Sazegari | G06F 8/4432 | 717/153 |
| 2011/0173597 A1* | 7/2011 | Cascaval | G06F 9/44505 | 717/148 |
| 2012/0060142 A1* | 3/2012 | Fliess | G06F 8/70 | 717/102 |
| 2012/0102448 A1* | 4/2012 | Haugestuen | G06F 17/5031 | 716/134 |
| 2012/0137101 A1* | 5/2012 | Arcese | G06F 9/5016 | 711/170 |
| 2012/0166831 A1* | 6/2012 | Shimoda | G06F 1/3237 | 713/320 |
| 2012/0174059 A1* | 7/2012 | Jaladeen | G06F 8/10 | 717/105 |
| 2012/0233599 A1* | 9/2012 | Valdiviezo Basauri | G06F 8/41 | 717/126 |
| 2012/0239971 A1* | 9/2012 | McMahan | G06F 11/362 | 714/15 |
| 2012/0254846 A1* | 10/2012 | Moir | G06F 9/467 | 717/152 |
| 2013/0031531 A1* | 1/2013 | Keynes | G06F 8/74 | 717/126 |
| 2013/0061213 A1* | 3/2013 | Felch | G06F 8/4434 | 717/149 |
| 2013/0080805 A1* | 3/2013 | Vick | G06F 8/4432 | 713/320 |
| 2013/0086568 A1* | 4/2013 | Krishnamurthy | G06F 9/4493 | 717/154 |
| 2013/0125077 A1* | 5/2013 | Rozen | G06F 17/505 | 716/119 |
| 2013/0132048 A1* | 5/2013 | Yamamoto | G06F 11/302 | 703/2 |
| 2013/0132916 A1* | 5/2013 | Ootsubo | G06F 17/5045 | 716/104 |
| 2013/0166886 A1* | 6/2013 | Sasanka | G06F 9/30098 | 712/216 |
| 2013/0173933 A1* | 7/2013 | Ramani | G06F 1/3228 | 713/300 |
| 2013/0179863 A1* | 7/2013 | Vangala | G06F 8/74 | 717/124 |
| 2013/0191817 A1* | 7/2013 | Vorbach | G06F 8/4441 | 717/150 |
| 2013/0198499 A1* | 8/2013 | Dice | G06F 9/30079 | 712/239 |
| 2013/0268742 A1* | 10/2013 | Yamada | G06F 9/5044 | 712/226 |
| 2013/0346979 A1* | 12/2013 | Nightingale | G06F 8/456 | 718/100 |
| 2014/0136858 A1* | 5/2014 | Jacobson | G06F 9/46 | 713/300 |
| 2014/0189249 A1* | 7/2014 | Ye | G06F 12/0862 | 711/137 |

OTHER PUBLICATIONS

Prabal K. Dutta et al., System Software Techniques for Low-Power Operation in Wireless Sensor Networks, Nov. 6-10, 2005, [Retrieved on Jun. 19, 2018]. Retrieved from the internet: <URL: http://delivery.acm.org/10.1145/1130000/1129732/9254925.pdf> 8 Pages (924-931) (Year: 2005).*

* cited by examiner

400

```
message = httpget("firstdata");
x = process(message);
message1 = httpget("seconddata");
y = process(message1, x );
```

500

MODIFYING CODE TO REDUCE REDUNDANT OR UNNECESSARY POWER USAGE

CROSS-REFERENCE TO RELATED APPLICATIONS

This application claims the benefit of U.S. Provisional Application No. 61/751,266, entitled "MODIFYING CODE TO REDUCE REDUNDANT OR UNNECESSARY POWER USAGE" and filed on Jan. 11, 2013, which is hereby incorporated herein by reference.

FIELD

This application relates to techniques for modifying code (e.g., source code) to reduce redundant or unnecessary power usage in the device for which the source code is targeted (e.g., a mobile device, such as a smart phone or tablet computer).

SUMMARY

Disclosed below are representative embodiments of methods, apparatus, and systems for analyzing and/or transforming code (typically, source code) to reduce or avoid redundant or unnecessary power usage (e.g., power cycling, resource leak bugs, and/or unnecessarily repeated activity) in the device that will ultimately execute the application defined by the source code. The disclosed methods can be implemented by a software tool (e.g., a static program analysis tool or EDA analysis tool) that analyzes and/or transforms source code for a software application to help improve the performance of the software application on the target device. The disclosed methods, apparatus, and systems should not be construed as limiting in any way. For example, although many of the embodiments disclosed herein are described as being capable of modifying source code, embodiments of the disclosed technology can be adapted to analyze and modify other types of code (e.g., object code). In general, the present disclosure is directed toward all novel and/or nonobvious features and aspects of the various disclosed embodiments, alone or in various combinations and subcombinations with one another.

DETAILED DESCRIPTION

I. General Considerations

Figure 1:
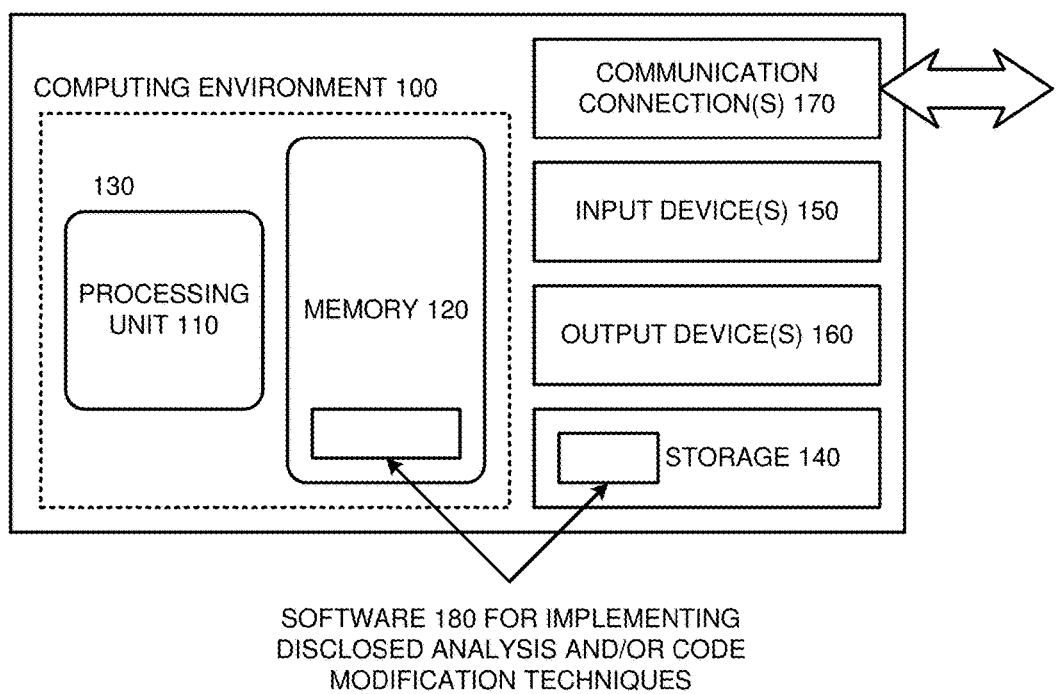
FIG. 1 is a block diagram illustrating a computing environment in which aspects of the disclosed technology can be performed.

Disclosed below are representative embodiments of methods, apparatus, and systems for analyzing and/or transforming source code to reduce or avoid redundant or unnecessary power usage in a target device (e.g., a mobile device, such as a smart phone or tablet computer). The disclosed methods can be implemented by a software tool (e.g., a static program analysis tool or EDA tool) that analyzes and/or transforms source code (or other code, such as the object code) for a software application to help improve the power performance of the software application on the target device. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "identify" to describe the disclosed methods. These terms are high-level abstractions of the actual operations that are performed. The actual operations that correspond to these terms may vary depending on the particular implementation and are readily discernible by one of ordinary skill in the art. Additionally, as used herein, the term "and/or" means any one item or combination of any items in the phrase. Further, the terms "data flow graph" and "control flow graph" are sometimes used interchangeably and include a data flow graph, control flow graph, or a control data flow graph ("CDFG").

II. Exemplary Computing Environments for Implementing Embodiments of the Disclosed Technology Any of the disclosed methods can be implemented as computer-executable instructions stored on one or more computer-readable media (e.g., one or more optical media discs, volatile memory components (such as DRAM or SRAM), or nonvolatile memory components (such as hard drives)) and executed on a computer (e.g., any suitable computer, including desktop computers, servers, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), a distributed computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, JAVA, PERL, JAVASCRIPT, PYTHON, or any other suitable programming language. Similarly, the disclosed technology can be used to analyze source code written in any computer language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can alternatively be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")).

FIG. 1 illustrates a generalized example of a suitable computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described code analysis/modification tools or techniques described herein. For example, the memory 120 can store software 180 for implementing any of the disclosed techniques described herein and their accompanying user interfaces.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, solid state drives (e.g., flash drives), magnetic tapes or cassettes, CD-ROMs, DVDs, or any other tangible non-transitory non-volatile storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment but do not encompass transitory signals or carrier waves. By way of example, and not limitation, with the computing environment 100, computer-readable media include tangible non-transitory computer-readable media, such as memory 120 and/or storage 140.

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
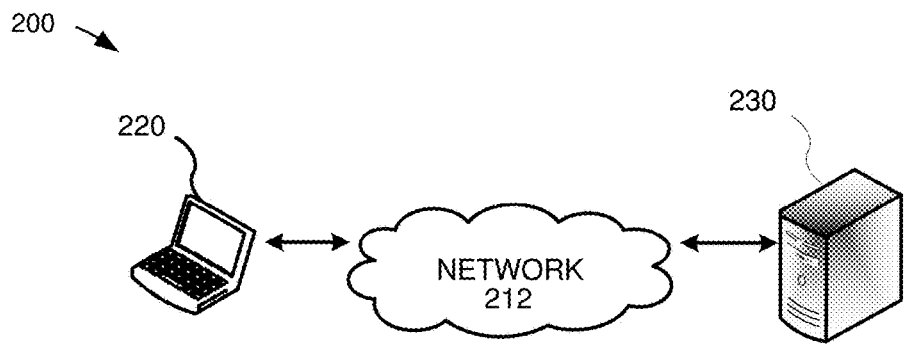
FIG. 2 is a block diagram showing an exemplary network environment in which aspects of the disclosed technology can be performed.

An example of a possible network topology 200 (e.g., a client-server network) for implementing a system using the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., tablet computers, mobile computing devices, servers, network devices, dedicated devices, and the like). In the illustrated embodiment, the computing device 220 is configured to communicate with a server 230 (e.g., a remote server, such as a server in a cloud computing environment) via a network 212. In the illustrated embodiment, the computing device 220 is configured to transmit input data to the server 230 and the server 230 is configured to implement any of the disclosed methods and provide results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
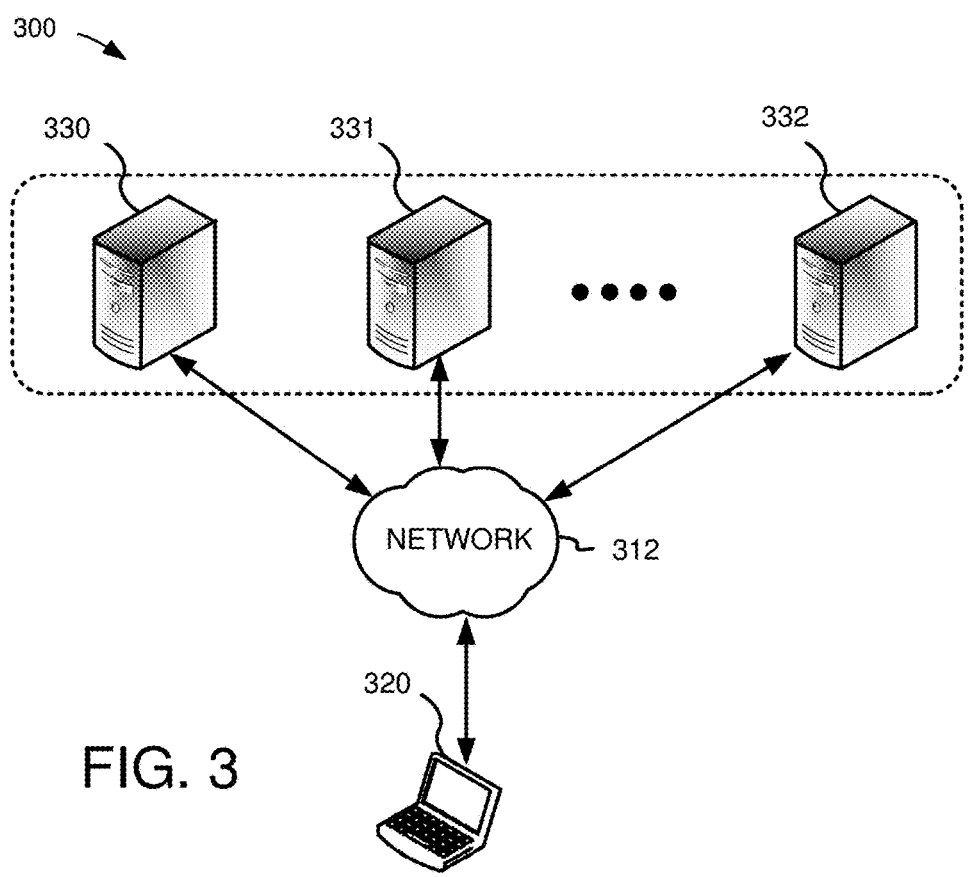
FIG. 3 is a schematic block diagram of another exemplary network environment in which aspects of the disclosed technology can be performed.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of the code analysis and/or transformation process. In other words, the computing devices 330, 331, 332 form a distributed computing environment in which the analysis/transformation process is shared across multiple computing devices. The computing device 320 is configured to transmit input data to the computing devices 330, 331, 332, which are configured to distributively implement an analysis/transformation process, including performance of any of the disclosed methods, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

III. Embodiments of the Disclosed Power Reduction Techniques

A. Introduction

Described in this section are methods, systems, and apparatus that can be used to analyze and transform source code for an application in order to reduce or avoid redundant or unnecessary power usage (e.g., redundant power cycling, resource leak bugs, or unnecessarily repeated activities) in the target hardware in which the application will be executed. Embodiments of the disclosed methods can be implemented as part of a static program analysis tool or as part of an electronic design automation ("EDA") tool (e.g., an HDL or source code verification tool) that performs functional verification of source code (or other algorithmic description) of an application or program.

B. Batching to Avoid Redundant Power Cycling

Figures 4, 5:
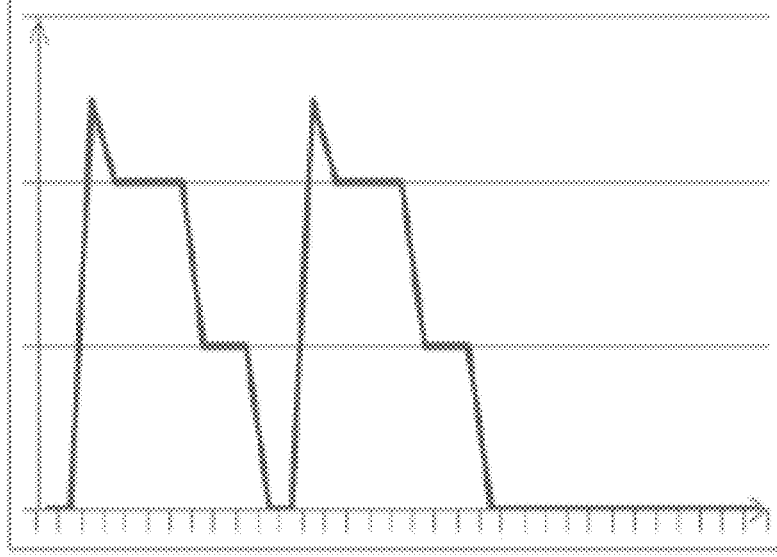
FIG. 4 is an example pseudocode segment that creates redundant power cycling.
FIG. 5 is an example power profile of a radio transceiver being activated in a device as a result of the example pseudocode of FIG. 4.
Figures 6, 7:
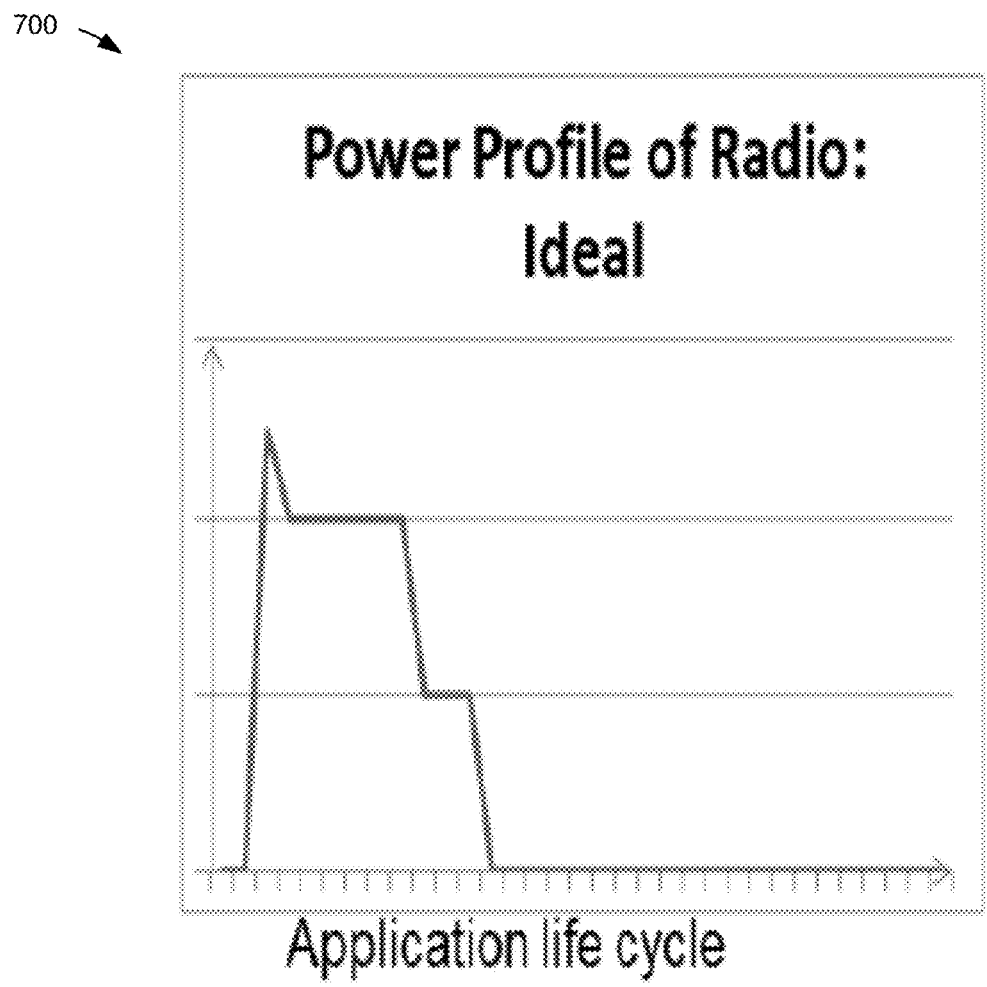
FIG. 6 is an example of a transformed version of the pseudocode segment of FIG. 4 that avoids redundant power cycling.
FIG. 7 is an example power profile of a radio transceiver being activated in a device as a result of the example code of FIG. 6.

FIG. 4 shows an exemplary segment of code 400 (shown as pseudocode) for an application that transmits two messages from a radio element of a device (e.g., a transceiver of a smart phone or tablet computer) at separate times during the application's life cycle. FIG. 6 shows an exemplary segment of code 600 for the same functionality as in FIG. 4 but with the instructions in a different order. In the ordering of FIG. 4, the pseudocode comprises an interleaving of the processing of the radio element requests. In the ordering of FIG. 6, by contrast, the radio element requests are batched to reduce redundant power cycling.

More specifically, the exemplary code segments shown in FIGS. 4 and 6 are code segments for an application designed to be run on a mobile device and to invoke operation of a power-consuming hardware component of the mobile device. For such an application, the second pseudocode (shown in FIG. 6) is more power efficient. The power profile for the radio element of the target architecture (in this example, a smart phone) for the two codes segments illustrates the difference in power efficiency. In the first power profile, shown in profile 500 of FIG. 5, there are two power cycles for doing the same total transmission work as in the second code segment of FIG. 6, whose power profile is shown as power profile 700 in FIG. 7. Thus, while the same transmission power may be consumed by the radio for the actual transmission, the transitions for getting the radio component through its various power states from "off" to fully "on", and then to "standby" and then back to "off" consume significant extra power. The wasted power is due the fact that one complete power cycle of these transitions is redundant in the first case (illustrated by comparing FIGS. 4 and 5), and the period of inactivity of the radio is not long enough to recover the cost of the unnecessary transitions.

Accordingly, embodiments of the disclosed technology comprise transformation techniques to modify the source code of an application to reduce redundant power cycling. Furthermore, although the disclosed techniques are described in terms of techniques for reducing the use of a radio element (e.g., a transceiver), the disclosed techniques are more generally applicable to other hardware elements that consume power (e.g., an sdcard, storage, secondary storage, or other such power-consuming component). In general, the embodiments disclosed in this section concern methods for batching requests to hardware elements that consume power. The disclosed techniques can also be used to batch database accesses to improve power and performance efficiency.

1. Automating Batching of Requests to Eliminate Redundant Power Cycling

In one exemplary implementation of the disclosed technology, the process of transforming source code into source code that reduces or eliminates redundant power power cycling comprises: detection of situations where batching is possible; estimating the gain in power efficiency; and modifying the source code of the app to reflect the desired behavior a. Detection In certain exemplary embodiments, the detection of a situation where batching is possible comprises identifying the instructions in a candidate sequence. Consider, for example, a candidate sequence $c(0), c(1), \ldots c(n)$. Any two instructions $c(i), c(j)$, where $j>i+1$, can be batched if and only if $c(j)$ is independent of any instruction $c(l)$ where $i<l<j$. This analysis could be performed using a data flow graph corresponding to the instruction sequence. Some embodiments of the disclosed technology involve a data flow analysis of the source code. The analysis of the source code in some embodiments of the disclosed technology involves one or more of the following:

i. Proper Data Flow Analysis

In source code, each instruction could be a method call on a program object (e.g., a sequence of instructions itself). In certain implementations, all method calls are inlined into one monolithic program. However, such inlining is often a computationally intensive task for larger applications. Furthermore, library function calls typically remain completely interpreted, so any modification of a global state by library function calls will be invisible to such traditional compilers. Therefore, in some implementations, the detection act is performed by:

1. Identifying the library function calls that correspond to the instructions of interest (e.g. radio requests).
2. Abstracting away details of other method calls in order to leave skeleton calls behind that capture one or more of the following (e.g., only the following): (a) the conditions under which the global state is modified (e.g., the conditions that affect methods outside the local scope of the abstracted method); (b) computations that affect the control flow of the program; and/or (c) the conditions that determine the data flow through the method call.
3. Analyzing the data flow across method call boundaries to obtain a set of candidate reordering sequences.

ii. Exception Handling

Some of the instructions (or the instructions within) could throw exceptions, leading to cases where $c(j)$ is not executed at all after $c(i)$. Therefore, in certain implementations, the data flow analysis is desirably augmented to do the following check: the instructions $c(i)$ to $c(j)$ must either not modify a global program state or the global state change must not persist once an exception is thrown (or equivalently, where the exception is caught) by an instruction $c(l)$ such that $i<l<j$. Further, the detection mechanism may ignore some exceptions as "safe" exceptions based on user specifications.

iii. Threading Analysis

Still further, in some implementations, the analysis of the source code involves an analysis of threading. Threading introduces the complexity of shared memory. Hence, the handling in subsections i. and/or ii. above can be modified to account for possible shared memory modification by $c(i) \ldots c(j)$. In particular implementations, for instance, shared memories between threads are treated as a global state.

b. Estimation

In certain embodiments, the gain of performing a batching operation is estimated as part of the analysis. For instance, in particular implementations, the gain is estimated by performing the following:

1. Computing a minimum or an average bound on the time period within which instructions $c(i+1) \ldots c(j-1)$ are executed. This can be done, for example, by getting a minimum instruction count by adding a unit for every instruction that is guaranteed to be executed. If there is an execution trace file available, an average can be computed across the number of times that the candidate sequence is executed.
2. Analyzing the transitions of the various power states of components. For example, a finite state machine can be constructed to represent the transitions of the various power states of components, such as the radio. Each state can be annotated with its associated power. Additionally, the power associated with each transition can also be obtained. Still further, the idle time after which the component would transition into a lower power state can also be obtained.

Figure 8:
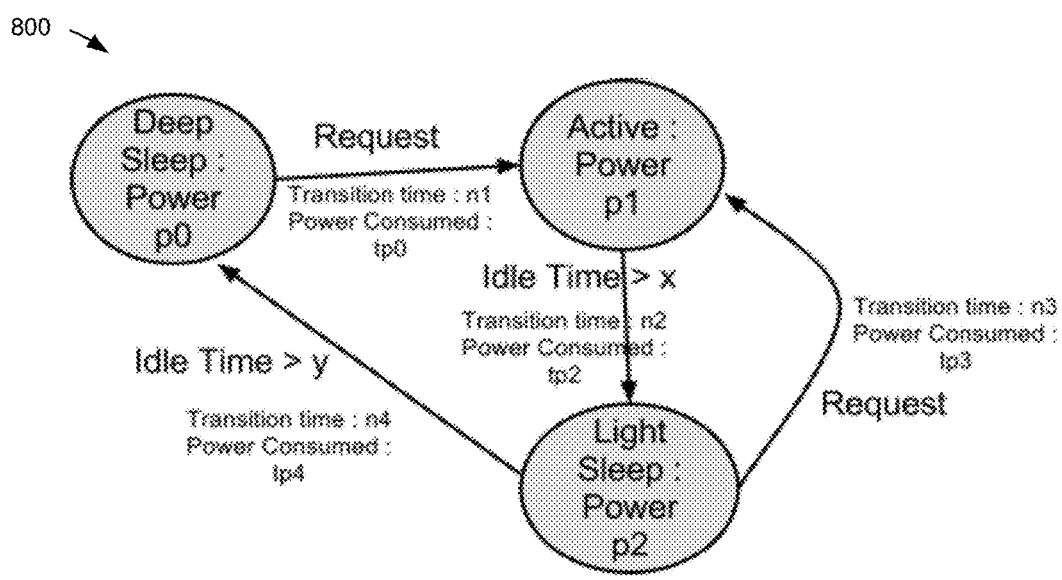
FIG. 8 is an example state diagram representing transitions of various power states of components in a target device.

An example of such a pre-characterized FSM is shown in block diagram 800 of FIG. 8.

In one particular implementation, if the bound computed in step 1 above is denoted as b, the following equations give a good estimate of the power saved by batching $c(i)$ and $c(j)$:

$$p_{saved} = tp2 + tp4 + tp0, \text{ if } b > n4 + n2$$

$$= tp2 + tp3, \text{ if } b > n2$$

$$= 0, \text{ otherwise}$$

c. Modification

In certain embodiments, modifying the source code includes maintaining the relationship of each instruction with the original source code. For example, in certain implementations, the transformation is first implemented as a simple restructuring of the data flow graph. The eventual modification of the source files may be done only to the affected lines and the affected files by a scripting utility.

2. Example General Embodiment

Figure 15:
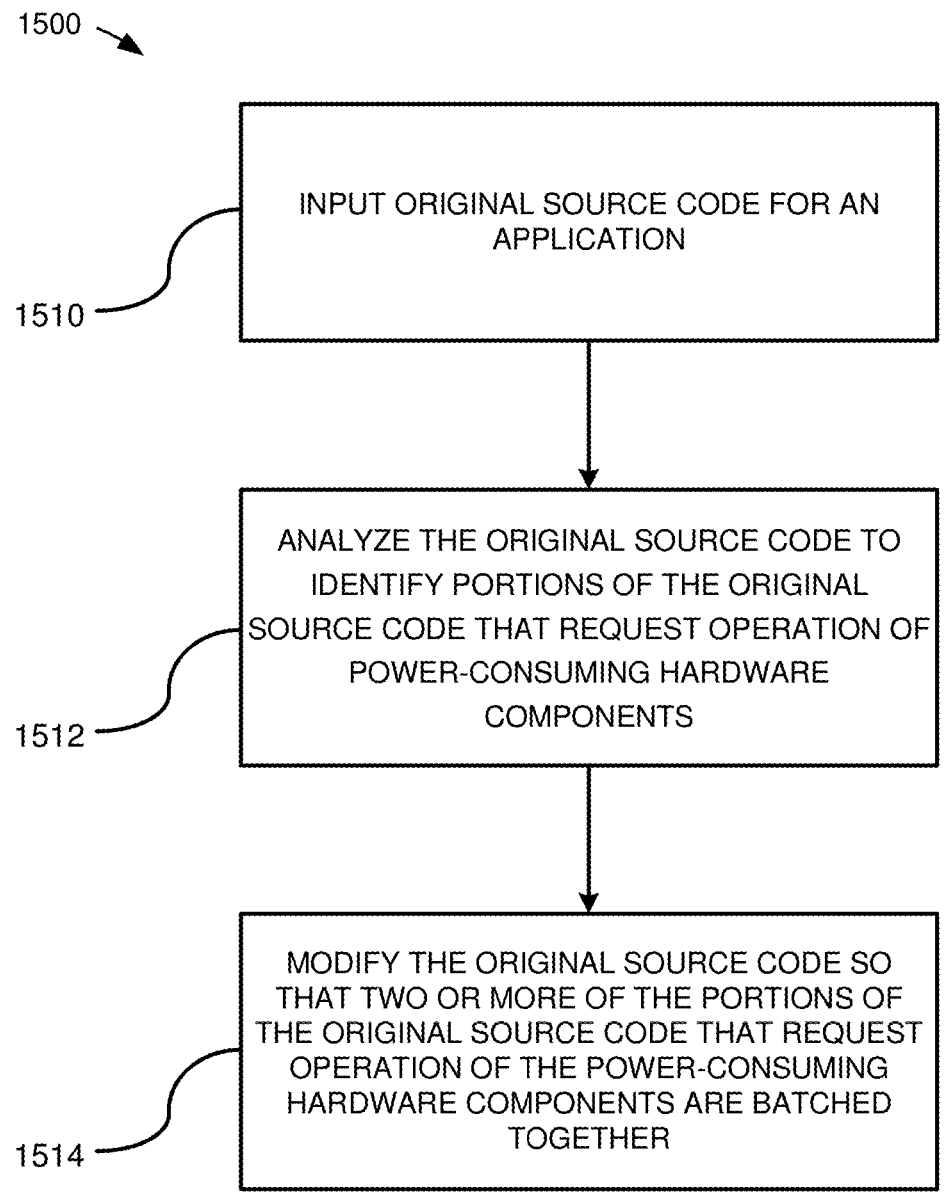
FIG. 15 is a flowchart illustrating an embodiment of the disclosed technique for modifying source code with unnecessary power cycling.

FIG. 15 is a flowchart 1500 illustrating an embodiment of the disclosed technique for modifying source code with unnecessary power cycling. The method acts disclosed in FIG. 15 can be performed alone or in any combination or subcombination with one another or with other method acts. Furthermore, the method acts can be performed automatically by appropriate EDA or analysis software. Such software can be stored on a computer-readable readable medium (e.g., a non-transitory computer-readable medium) and executed by a computing device. Still further, the particular order of presentation shown in FIG. 15 is not to be construed as limiting, as the method acts shown and described can be performed in different orders or at least partially concurrently.

At 1510, original source code for an application is input.

At 1512, the original source code is analyzed to identify portions of the original source code that request operation of one or more power-consuming hardware components.

At 1514, the original source code is modified so that two or more of the portions of the original source code that request operation of the one or more power-consuming hardware components are batched together, thereby creating modified source code from which the one or more power-consuming hardware components are operated in a more power efficient manner.

In some embodiments, the analyzing and the modifying reduces or removes instances of redundant power cycling from the original source code. In certain embodiments, the analyzing comprises generating and analyzing a data flow graph representative of the original source code. In such embodiments, the modifying can comprise restructuring the data flow graph. Further, the modifying can comprise modifying affected lines of the original source code based on the restructured data flow graph. In some embodiments, the analyzing comprises estimating a gain from batching together the two or more of the portions. In such embodiments, the estimating can comprise determining a time period between execution of the two or more of the portions of the original source code that request operation of the one or more power-consuming hardware components. Further, the estimating can comprise constructing a finite state machine that represents various power states of the power-consuming hardware components and that includes an estimated power for each of the various power states. In some embodiments, the one or more power-consuming hardware components comprise a radio transceiver, processor, or other power-consuming component of a mobile device. In certain embodiments, the data flow graph comprises a CDFG, control flow graph, or other appropriate graph or data flow model. Further, in some embodiments, redundant power cycling in the "power-hungry" hardware components that dominate power consumption in a particular device is targeted. For instance, depending on the device in which the components operate, radio transceivers, processors, hard drives, components with higher current drawn per unit cycle of operation relative to the other components of the device, or other such power-hungry components may be targeted.

C. Fixing Resource Leak Bugs

Certain embodiments of the disclosed technology detect and fix resource leak bugs that are found in the source code of an application. These embodiments can be used alone or together with the redundant power cycling reduction techniques disclosed above or the other techniques disclosed herein.

Figure 9:
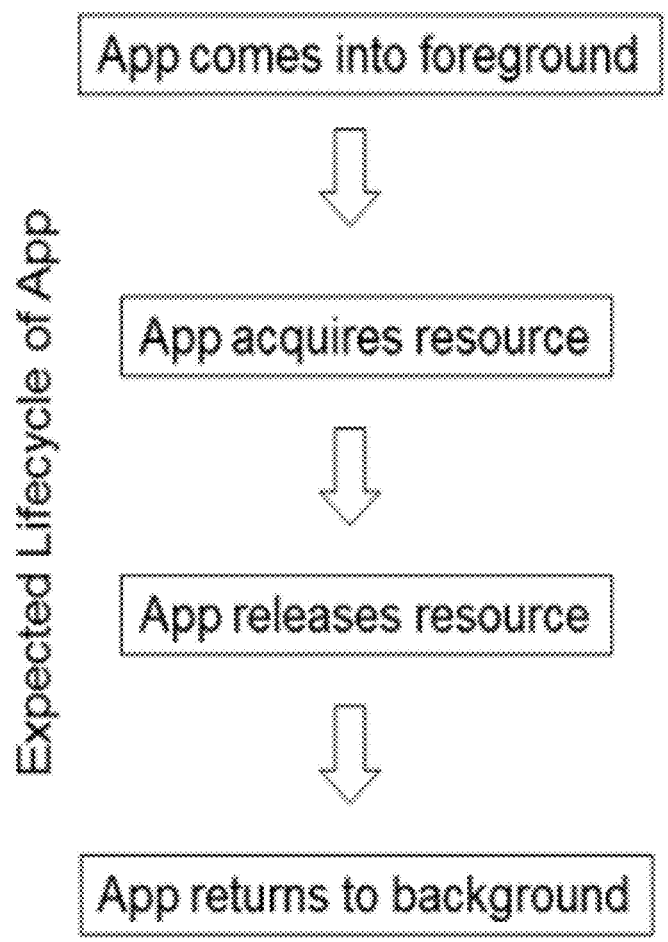
FIG. 9 is a flow chart illustrating a code segment that does not include a resource leak bug.
Figure 10:
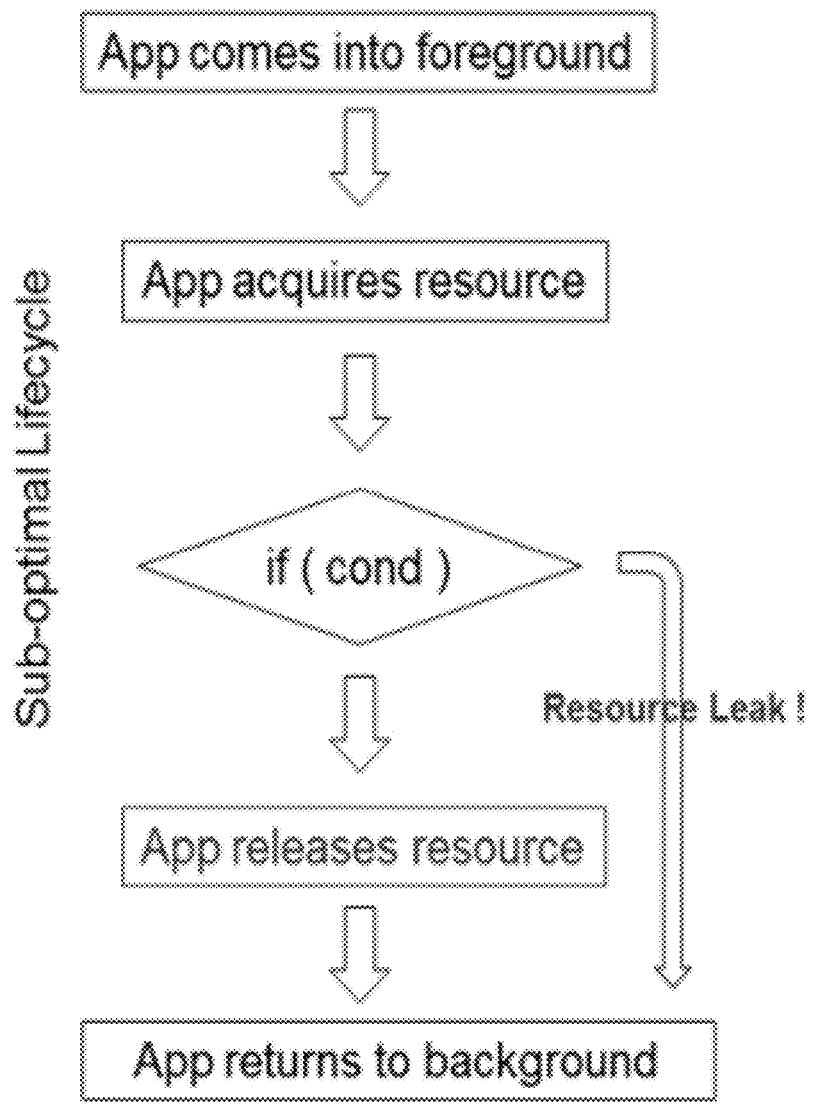
FIG. 10 is a flow chart illustrating a code segment that does include a resource leak bug.

FIGS. 9 and 10 are flow charts that illustrate a typical resource leak bug. In particular, FIG. 9 is a flow chart that illustrates a typical lifecycle of an application in which there is no resource leak bug. FIG. 10, by contrast, shows a lifecycle of an application that includes a resource leak bug. The resource is typically a software component (e.g., a GPS handle object or a screen/cpu wakelock) that interfaces with a power-hungry hardware component. As shown in both FIGS. 9 and 10, an application is typically required to request the resource explicitly because of the aggressive power management schemes of hardware components such as the GPS, the CPU and the screen; the hardware component is otherwise maintained in a low power state by the operating system. Once an application requests a resource, the hardware component continues to be active until the application explicitly releases the resource. As illustrated in FIG. 10, there are sometimes cases in the control flow of the application in which the resource is not released. In such a situation, the hardware component would continue to be on and burn power.

1. Automating the Detection of Resource Leak Bugs

The detection of resource leak bugs desirably involves finding a condition in the control flow graph of the application under which the application does not release an acquired resource. For instance, a CDFG or other appropriate graph can be used. Generally speaking, detecting a class of resource leak bugs is analogous to the formal detection of memory leaks. Formal methods, such as invariant analysis and predicate abstraction facilitate a practical solution to detecting one or more resource leak bugs.

For applications, however, a straightforward translation of such formal methods will only work for limited cases. Some of the complexities of formally analyzing applications in the context of the disclosed technology have been discussed above with respect to the batching of requests. There are some additional considerations that are relevant to the detection of resource leak bugs and are incorporated into embodiments of the disclosed technology (these additional considerations could be applicable to batching requests too, but are generally more applicable to the context of resource leaks).

For example, event-based triggering mechanisms (e.g., asynchronous behavior) are typical of smartphone applications. During most of their life cycle, applications are responding to events from the user interface. The event-based triggering mechanisms often mask code structure that is usually easily visible in traditional software code. For example, an application registers a callback to receive location updates from the GPS after requiring the GPS. The code for the callback typically looks like:

```
onLocationUpdate(Location location)
{
. . . . . .
}
```

In this example, the callback is invoked every time the OS communicates a location to the app. Hence, there is actually an implicit loop around the callback, which initializes once the app registers the callback, and terminates once the app asks to stop receiving updates. If the app does not ask to stop receiving updates, there is a leak. Hence, it is desirable to transform the above view for the callback to something like:

```
if(updates_callback_registered)
{
do
{
Location loc=getLocation( )
onLocationUpdate(loc)
```

} while(updates_not_cancelled)
}

This form is far more suitable to apply to predicate abstraction methods, where the methods try to find a counter-example for which the while loop does not terminate. In certain embodiments, the conditions in the transformed code above are generated by a transformation mechanism via formal analysis. Further, the post-transformation code is typically not intended to be equivalent to the original (for instance, the GPS trigger has been converted to a polling mechanism in the transformed code). Instead, the post-transformation code is provided to produce a representation of the code that renders the problem into a more suitable form for predicate abstraction methods.

2. Elimination of Resource Leak Bugs

In particular embodiments of the disclosed technology, eliminating a detected case of a resource leak comprises running the counter-example through the application control flow graph (e.g., a CDFG) to find a branch under which a resource is leaked. When the culprit branch is identified, a resource release command for the particular resource is inserted into the code using a similar mechanism as described above in the section on batching requests. In particular, in certain implementations, the transformation is first implemented as a restructuring of the data flow graph. The eventual modification of the source files can be done, for example, to the affected lines and the affected files by a scripting utility or other automated process. For instance, in certain implementations, source code relationships between the source code and the original data flow can be used to determine which parts of the source code should be moved and/or replaced in order to create a modified version of the source code that reflects the restructured data flow graph.

The method disclosed above, however, may not cover multiple leak paths. Detecting one case of a resource leak is usually insufficient to allow elimination of all possibilities of leaking the same resource instance. There could be multiple paths within the source code through which the same resource instance could be leaked. To address this, and in certain implementations of the disclosed technology, the method is iteratively performed to eliminate detected leak cases. The method can then terminate when all such cases are found (e.g., using a skeleton method that is useful when no precise closed-form algorithm exists). These implementations can be more generally described as methods that comprise trying to find a condition under which a leak happens, eliminating it from consideration, and repeating until no such conditions are found on a candidate code section.

Alternatively, in other implementations, the process comprises identifying the union of all conditions upon which a resource is acquired and identifying the union of all the conditions upon which the resource is released. Then, a difference between the two can be determined that identifies where there are resource leaks. These implementations can be more generally described as methods that use a set difference between the union of all conditions or resource releases that are specified and the union of all conditions of resource acquisitions.

In certain embodiments of the disclosed technology, both types of approaches are available for use in a software tool, as the performance and effectiveness of each may vary depending on the particular code being restructured.

Furthermore, it is typically desirable to minimize the code changes required, which helps ensure that the app code does not bloat to a size where it overflows the tight constraints of the smartphone environment. Hence, when locating multiple control flow paths to identify the points of resource leaks, it is desirable to locate common exit points for these leaking paths. The common exit points may be used to place the resource release command in a manner that reduces or minimizes the number of release commands and/or delay in the resource release (e.g., by ensuring that as few release commands are required with minimal delay in the resource release (if the delay is considerable, the effect is similar to a resource leak)). The following example illustrates code commented to show two common exit points where a resource release command could be located. The first location is desirable over the second in view of the intervening code that defines a long process:

```
if(cond1)
{
  if(cond 2)
  {
    // leak!
  }
}
else
{
  // leak!
}
// insert resource release command here
my_long_process( )
// resource release insertion here is sub-optimal
```

3. Example General Embodiment

Figure 16:
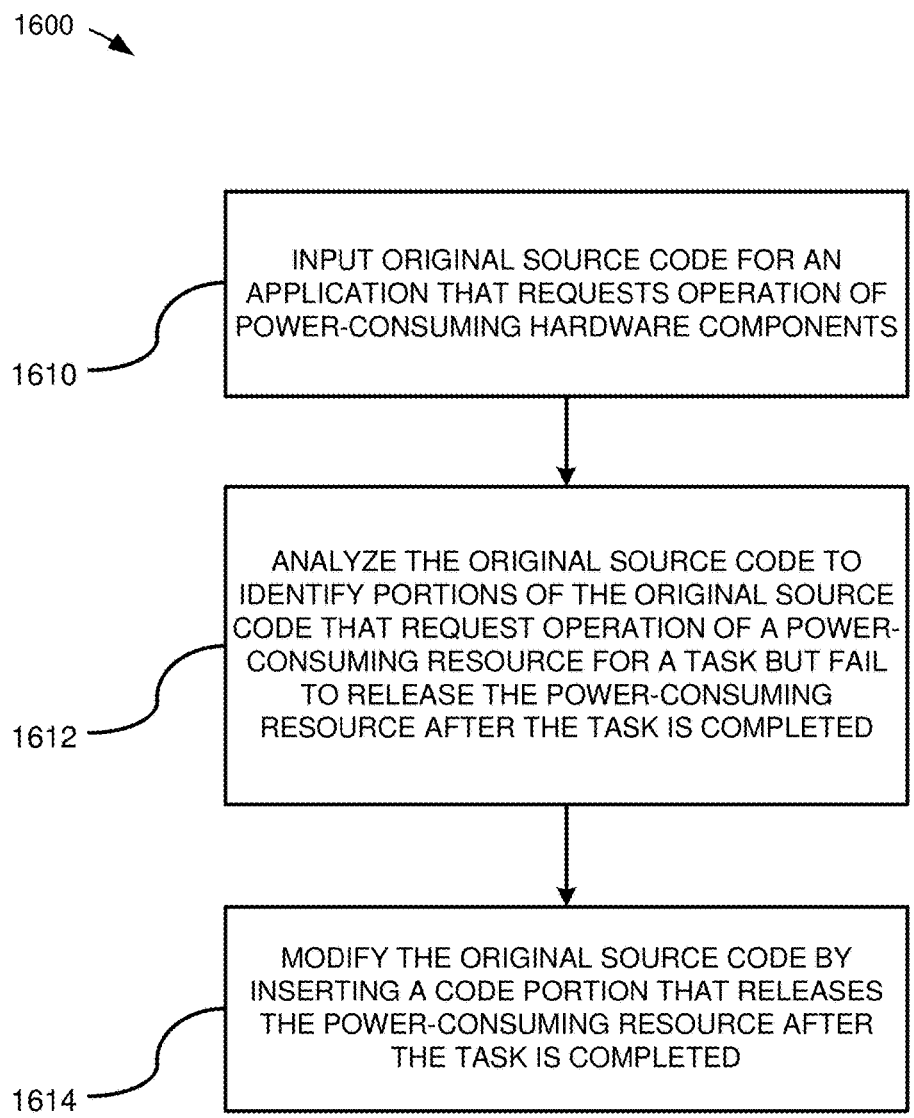
FIG. 16 is a flowchart illustrating an embodiment of the disclosed technique for modifying source code with resource leaks.

FIG. 16 is a flowchart 1600 illustrating an embodiment of the disclosed technique for modifying source code with resource leaks. The method acts disclosed in FIG. 16 can be performed alone or in any combination or subcombination with one another or with other method acts. Furthermore, the method acts can be performed automatically by appropriate EDA or analysis software. Such software can be stored on a computer-readable readable medium (e.g., a non-transitory computer-readable medium) and executed by a computing device. Still further, the particular order of presentation shown in FIG. 16 is not to be construed as limiting, as the method acts shown and described can be performed in different orders or at least partially concurrently.

At 1610, original source code is input for an application that requests operation of one or more power-consuming hardware components.

At 1612, the original source code is analyzed to identify portions of the original source code that request operation of a power-consuming resource for a task but fail to release the power-consuming resource after the task is completed.

At 1614, the original source code is modified by inserting a code portion that releases the power-consuming resource after the task is completed.

In certain embodiments, the analyzing and modifying reduces resource leaks caused by the original source code. In some embodiments, the analyzing comprises generating a data flow graph representative of the original source code, and analyzing branches of the data flow graph to identify one or more unreleased power-consuming resources. In certain embodiments, the modifying comprises inserting the code portion that releases the power-consuming resource at a location of the original source code corresponding to a common exit point for two or more branches of the data flow graph, where the two or more branches are identified as having a common unreleased power-consuming resource. In some embodiments, the modifying comprises restructuring the data flow graph. In such embodiments, the modifying can further comprise modifying affected lines of the original source code based on the restructured data flow graph. In certain embodiments, the method further comprises iteratively performing the analyzing and modifying as each instance of an unreleased power-consuming resource is identified. In some embodiments, the analyzing comprises identifying a first union of all conditions upon which a respective resource is acquired; identifying a second union of all the conditions upon which the respective resource is released; and determining a difference between the first union and the second union. In certain embodiments, the data flow graph comprises a CDFG, control flow graph, or other appropriate graph or data flow model. Further, in some embodiments, resource leak bugs for the "power-hungry" hardware components that dominate power consumption in a particular device are targeted. For instance, depending on the device in which the components operate, radio transceivers, processors, hard drives, components with higher current drawn per unit cycle of operation relative to the other components of the device, or other such power-hungry components may be targeted.

D. Elimination of Repeated Activity (Stability Redundancy)

Figure 11:
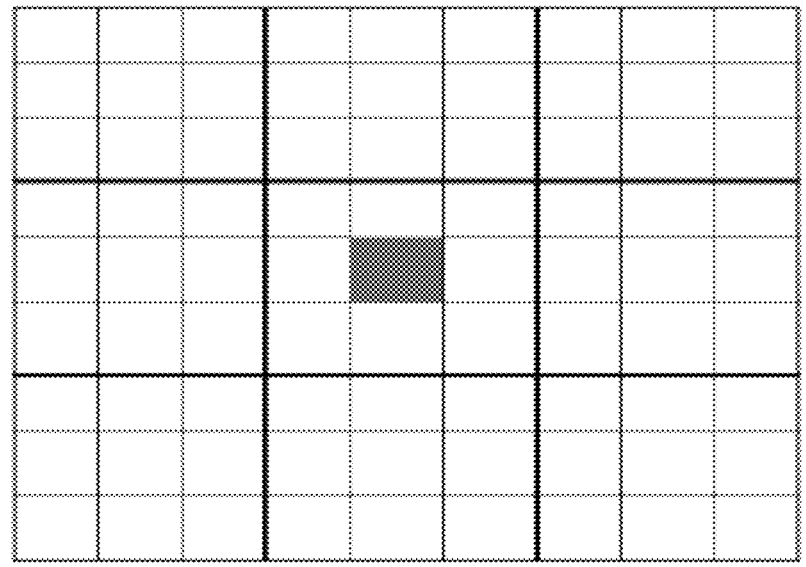
FIG. 11 is a block diagram illustrating the screen of a device implementing a board game where a small area is to be updated.
Figure 12:
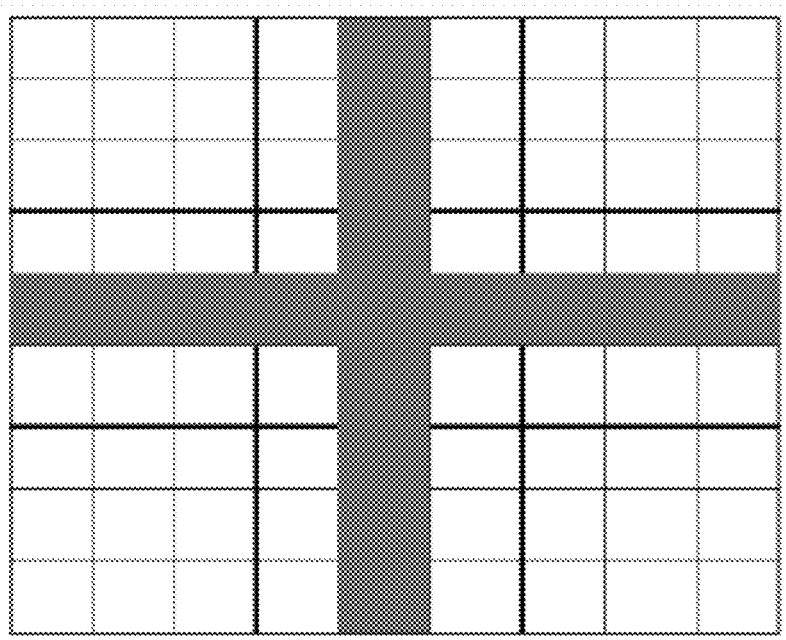
FIG. 12 is a block diagram illustrating the screen of a device implementing the board game and showing the actual area of the screen that may need updating to effectuate the update in FIG. 11.

To illustrate what is meant by repeated activity, consider a typical board view 1100 for a board game implemented on a mobile device (e.g., a smart phone) as shown in FIG. 11. The central colored square indicates a field requiring an update (for example, when the user wants to enter something in the field). The darkened region shown in view 1200 of FIG. 12 shows the impact of the update. In particular, the darkened region forming a plus may require re-rendering by the application.

Figure 13:
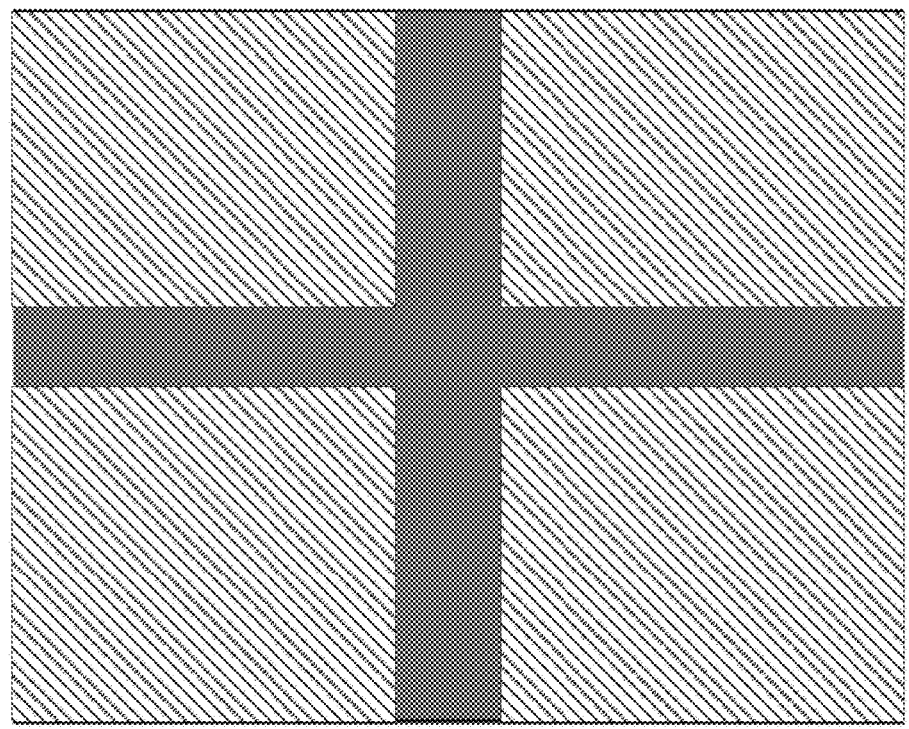
FIG. 13 is a block diagram illustrating the screen of a device implementing the board game and showing the area of the screen that may be updated in the presence of a stability redundancy.

The board view 1300 in FIG. 13 illustrates what an application that exhibits a repeated activity bug might do. The region around the plus shown in FIG. 12 (shown in diagonal hashes in FIG. 13) is rendered again by the application even though the region had already been processed identically before. Thus, the region around the plus represents wasted work, whereas the plus represents necessary work. Since the result of the processing of the region around the plus (the red region) has not changed, it is stable. This redundancy is referred to as "stability" redundancy.

1. Automation of Stability Optimization

Stability optimization is analogous to a class of compiler optimizations called loop invariant code motion. There is a task within a code loop that is independent of the loop iterations, and therefore can be moved to the head of the loop.

2. Detection of Cases

The detection of stability redundancies in application source code typically includes (in addition to the other issues discussed herein) identifying implicit loops across event-triggered callbacks. This problem was introduced in the previous section on resource leak optimizations. In certain implementations, detecting stability redundancies further comprises creating a visualization of a loop structure. For the board game example discussed above, the rendering of the board would likely happen in a callback, such as:
 onDraw( ){ render all
}

In particular embodiments, the method detects that between two successive calls to "onDraw", there are cases under which certain regions of the board are unaffected, and hence do not require to be rendered again (the previous results can be reused). For example, the loop structure can be restored (as it was in the resource leak section). Or, in certain implementations, two call instances of "onDraw" are created to understand the data and control flow between successive calls to "onDraw".

For example, there is an implicit loop around every callback that is triggered by events (e.g., using event listeners). The events can be input events or internal events, such as clock alarms or timer events. Analysis to reveal stability redundancy can comprise visualizing or representing the loop explicitly to detect stability between successive invocations of the event listener. For example, the "onDraw" routine is invoked by other callbacks, which are in turn triggered by input events (e.g., the user touching the board on a touchscreen). Successive invocations of the "onDraw" method could result in the bulk of the processing being the same across the invocations, where most of the inputs to "onDraw( )" hold their values across the invocations.

It is possible to determine stability redundancies by analyzing the relationship between the inputs to two successive calls to a method invoked by an event listener (e.g., "onDraw") after the loop around the event listener has been reconstructed. As an example, consider the following definition (in pseudocode):

```
class Board{
  Square[MAX_ROW][MAX_COL] squares; // declaring squares to be a
                                    // two-dimensional array of MAX_ROW
                                    // rows and MAX_COL columns
  (row,col) findAffectedSquare( int x_position, int y_position) ; //method
                                    // finds the (row,col) of the square
                                    // containing (x_position,y_position)
  Board( )
  {
    ....
    RegisterForTouchEvent( &(this.onTouch) ); // Start listening for input
                                              // touch events through
                                                    onTouch
  }
  onTouch( TouchEvent event)
  {
    int x_position = event.GetX( );
    int y_position = event.GetY( );
    (row,col) = this.findAffectedSquare(x_position,y_position);
    for i = 0 to MAX_ROW - 1
      squares[i][col].update( ) ; // squares affected along the column;
    for j = 0 to MAX_COL - 1
      squares[row][j].update( ) ; // squares affected along the row
      onDraw( squares );
  }
  onDraw( Square[ ][ ] squares )
  {
    for i = 0 to MAX_ROW - 1;
      for j = 0 to MAX_COL - 1;
        render squares[i][j];
  }
};
```

Now, if the only call to "onDraw( )" is the one in "onTouch" (this can be easily discovered by traversing the call-graph of the input source), the following loop structure can be added that will describe the invocation of "onTouch":

```
outer_onTouch( ) {
```

-continued

```
do {
  TouchEvent ev = waitForTouchEvent( ); // waitForTouchEvent( )
                                       // is a dummy procedure
                                       // that returns the same output event as the
                                       // argument which is passed to onTouch( )
                                       // this addition models the OS's behavior
of
                                       // waiting for an input touch event and
                                       // passing the event to onTouch( )
  onTouch( ev );
  } while(1)
}
```

Now, within this loop, "onTouch" will invoke "onDraw". The dataflow between two successive calls to "onDraw" can be analyzed by unrolling this loop (e.g., using a standard unrolling compiler transformation) by a factor of two:

```
unrolled_outer_onTouch( ) {
  do{
  TouchEvent ev1 = waitForTouchEvent( ); // waitForTouchEvent( )
                                         is a dummy
                                         // procedure that gives the same output event as
                                         // the argument which is passed to onTouch( )
                                         // this addition models the OS's behavior of
                                         // waiting for an input touch event and passing
                                         // the event to onTouch( )
  onTouch( ev 1 );
  TouchEvent ev2 = waitForTouchEvent( ); // waitForTouchEvent( )
                                         is a dummy
                                         // procedure that gives the same output event as
                                         // the argument which is passed to onTouch( )
                                         // this addition models the OS's behavior of
                                         // waiting for an input touch event and passing
                                         // the event to onTouch( )
  onTouch( ev2 );
  } while(1)
}
```

If onTouch is inlined (e.g., using a standard inlining compiler transformation), the following can be obtained:

```
inlined_unrolled_outer_onTouch( ) {
  do{
  TouchEvent ev1 = waitForTouchEvent( ); // waitForTouchEvent( )
                                         is a dummy
                                         // procedure that gives the same output event as the
                                         // argument which is passed to onTouch( )
                                         // this addition models the OS's behavior of waiting
                                         // for an input touch event and passing the event to
                                         // onTouch( )
  int x_position1 = event1.GetX( );
  int y_position1 = event1.GetY( );
  (row1,col1) = this.findAffectedSquare(x_position1,y_position1);
  for i1 = 0 to MAX_ROW - 1
    squares[i1][col1].update( ) ; // squares affected along the column;
  for j1 = 0 to MAX_COL - 1
    squares[row1][j1].update( ) ; // squares affected along the row
  onDraw( squares );
  TouchEvent ev2 = waitForTouchEvent( ); // waitForTouchEvent( )
                                         is a dummy
                                         // procedure that gives the same output event as the
                                         // argument which is passed to onTouch( )
                                         // this addition models the OS's behavior of waiting
                                         // for an input touch event and passing the event to
                                         // onTouch( )
  int x_position2 = event2.GetX( );
  int y_position2 = event2.GetY( );
  (row2,col2) = this.findAffectedSquare(x_position2,y_position2);
  for i2 = 0 to MAX_ROW - 1
    squares[i2][col2].update( ) ; // squares affected along the column;
  for j2 = 0 to MAX_COL - 1
    squares[row2][j2].update( ) ; // squares affected along the row
  onDraw( squares );
```

-continued

```
  } while(1)
}
```

At this stage, if the data flow from the first "onDraw( )" call is compared to the second, it can be determined that only a total of MAX_ROW+MAX_COL−1 of the squares in the two-dimensional array "squares" are modified between the two calls. Further, inlining "onDraw( )" will reveal that the rendering in the second call is repeated for every square in the MAX_ROW*MAX_COL squares on the board. In certain implementations, information to track updates to each of the squares is kept. Thus, only the squares that are updated can be rendered between successive invocations of "onDraw".

3. Optimizing Stability Redundancy Cases

Figure 14:
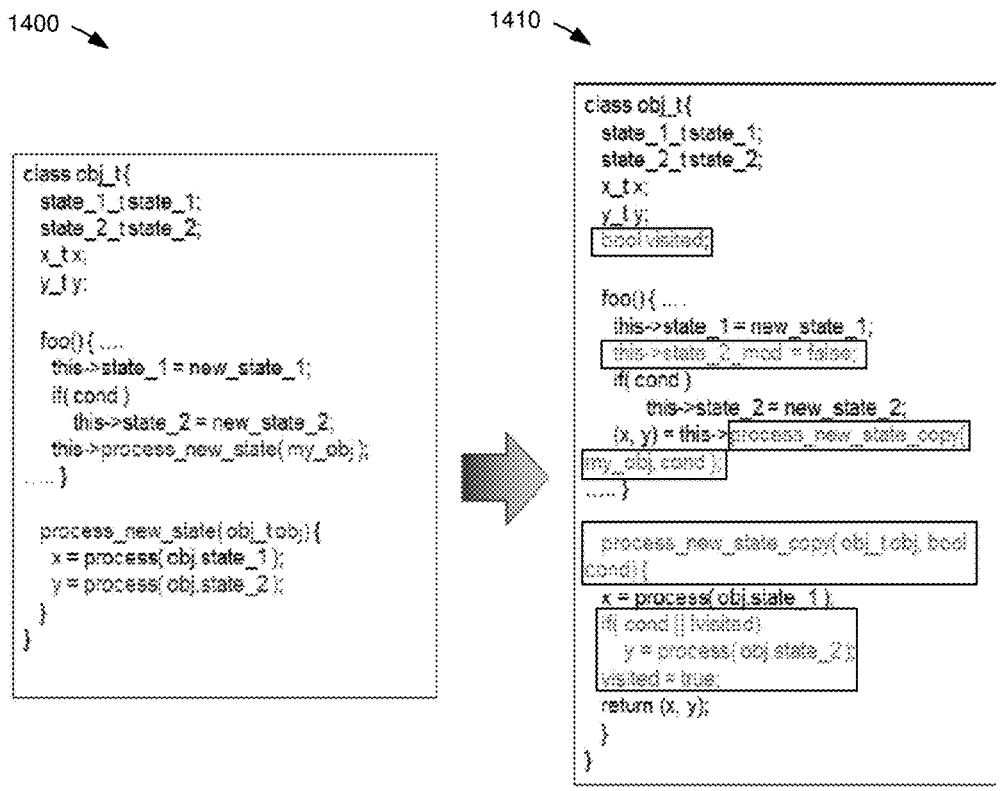
FIG. 14 shows an example of a code segment before stability redundancy improvement and after stability redundancy improvement.

In some embodiments, stability redundancy can be improved by estimating the memory cost of storing the results from the previous instance of the task that is to be optimized. In addition to the storage of results, it may also be desirable to account for flags that will be added to keep track of the changed data from the previous instance of the task. In particular implementations, if the memory cost is within a certain threshold, a modification to the source code is performed to improve the stability redundancy. FIG. 14 is a block diagram showing two example code segments that illustrate the stability redundancy improvement process. Code 1400 shows a code example before stability redundancy improvement, and code 1410 shows the code after improvement (where improvements are shown in the code portions highlighted by rectangles). The modification of the source code files can be done, for example, only to the affected lines and the affected files. As more fully explained above, a scripting utility or other automated process can be used to perform the modification.

4. Example General Embodiment

Figure 17:
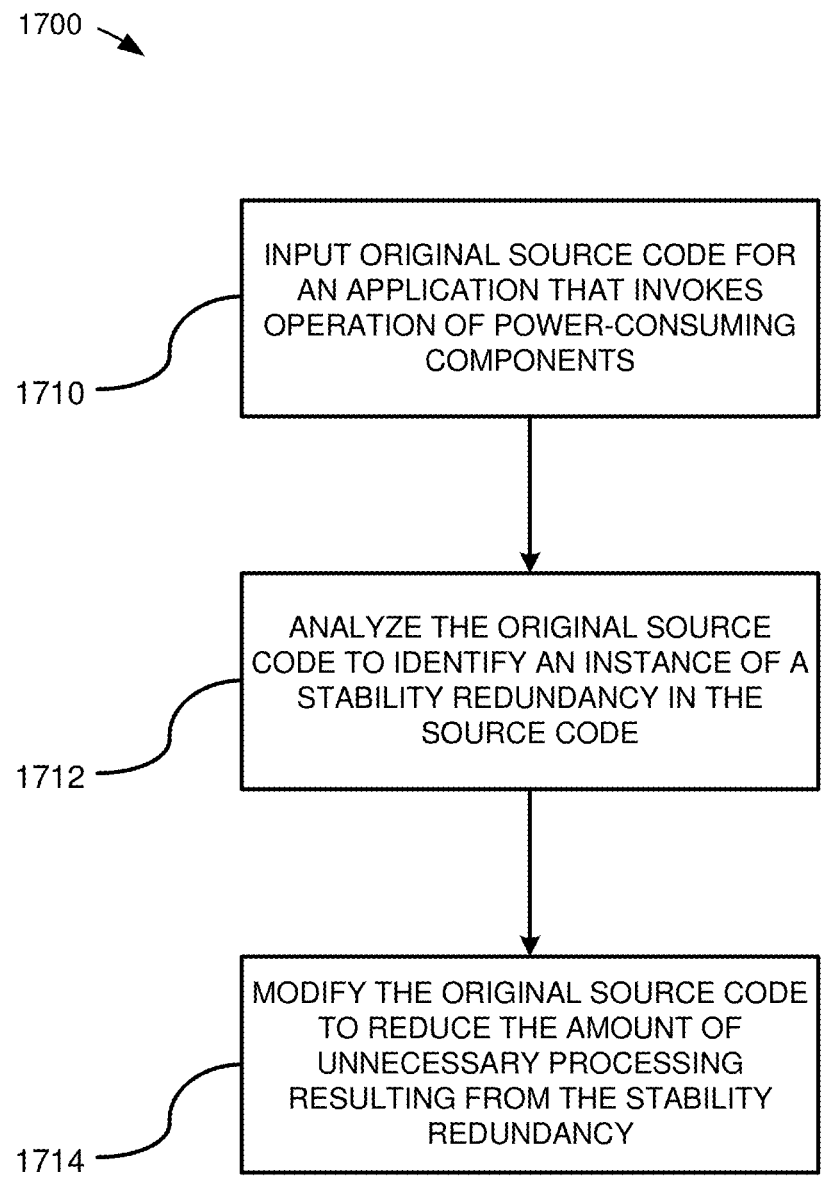
FIG. 17 is a flowchart illustrating an embodiment of the disclosed technique for modifying source code with stability redundancies.

FIG. 17 is a flowchart 1700 illustrating an embodiment of the disclosed technique for modifying source code with stability redundancies. The method acts disclosed in FIG. 17 can be performed alone or in any combination or subcombination with one another or with other method acts. Furthermore, the method acts can be performed automatically by appropriate EDA or analysis software. Such software can be stored on a computer-readable readable medium (e.g., a non-transitory computer-readable medium) and executed by a computing device. Still further, the particular order of presentation shown in FIG. 17 is not to be construed as limiting, as the method acts shown and described can be performed in different orders or at least partially concurrently.

At 1710, original source code is input for an application that invokes operation of one or more power-consuming components.

At 1712, the original source code is analyzed to identify an instance of a stability redundancy in the source code, the stability redundancy causing unnecessary processing to be performed during execution of two successive calls to a program object because one or more variables or values acted on by the two successive calls to the program object remain stable between the two successive calls.

At 1714, the original source code is modified to reduce the amount of unnecessary processing performed during the execution of the two successive calls to the program object.

In certain embodiments, the two successive calls invoke operation of a respective one of the power-consuming components. In some embodiments, the respective one of the power-consuming components is a touch screen, processor, or radio transceiver. In certain embodiments, the analyzing comprises unrolling loops from the source code that represents the two successive calls to the program object; inlining the unrolled loops; and identifying instances of redundant processing from the inlined source code. In some embodiments, the modifying comprises inserting one or more code segments into the original source code that create a tracking variable or tracking flag that tracks whether a respective one of the variables or values has been updated. In such embodiments, the modifying can further comprise inserting code segments into the original source code that bypass one or more operations from the original source code based on the tracking variable or tracking flag. In certain embodiments, the method further comprises: prior to the modifying, evaluating a memory cost of the modifying; and performing the modifying if the memory cost satisfies a memory cost threshold. Further, in some embodiments, stability redundancies in the "power-hungry" hardware components that dominate power consumption in a particular device are targeted. For instance, depending on the device in which the components operate, radio transceivers, processors, hard drives, components with higher current drawn per unit cycle of operation relative to the other components of the device, or other such power-hungry components may be targeted.

E. Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technology and should not be taken as limiting the scope of the invention. Rather, the scope of the invention is defined by the following claims and their equivalents. We therefore claim as our invention all that comes within the scope and spirit of these claims and their equivalents.

The invention claimed is:

1. A computer-implemented method for reducing power usage of a device, comprising:
   inputting, by computing hardware, original source code for an application;
   analyzing a situation where batching is possible by identifying, from one or more instruction sequences of the original source code, library function calls that corresponds to radio requests;
   estimating a power gain from batching together two or more portions of the original source code library function calls that request operation of one or more power-consuming hardware components, wherein the estimating comprises computing a minimum or average time period between execution of the two or more of the portions of the original source code library function calls, analyzing power state transitions of the radio request, and comparing the cost of the power state transitions with savings due to idle inactivity time of the power-consuming hardware components; and
   modifying, by the computing hardware, the original source code so that the two or more portions of the original source code are batched together removing instances of redundant power cycling, thereby creating modified source code from which the one or more power-consuming hardware components are operated in a more power efficient manner.

2. The computer-implemented method of claim 1, wherein the modifying reduce redundant power cycling from the original source code.

3. The computer-implemented method of claim 1, further comprising generating and analyzing a data flow graph representative of the original source code.

4. The computer-implemented method of claim 3, further comprising restructuring the data flow graph.

5. The computer-implemented method of claim 4, wherein the modifying further comprises modifying affected lines of the original source code based on the restructured data flow graph.

6. The computer-implemented method of claim 1, wherein the estimating comprises constructing a finite state machine that represents various power states of the power-consuming hardware components and estimating power for each of the various power states.

7. The computer-implemented method of claim 1, wherein the original source code is for an application to be executed on a mobile device, and wherein the one or more power-consuming hardware components comprise a radio transceiver of the mobile device.

8. The computer-implemented method of claim 1, wherein the modified source code is associated with a number of power cycles that is lower than a number of power cycles performed by the one or more power-consuming hardware components when operating under the original source code.

9. One or more non-transitory computer-readable media storing computer-executable instructions which when executed by a computer cause the computer to perform the method of claim 1.

10. A computer-implemented method comprising:
    inputting, by computing hardware, original source code for an application that requests operation of one or more power-consuming hardware components;
    analyzing, by the computing hardware, the original source code to identify portions of the original source code that request operation of a power-consuming resource for a task but fail to release the power-consuming resource after the task is completed, wherein the analyzing comprises:
      identifying a first union of multiple conditions specified in the original source code upon which the power-consuming resource is acquired;
      identifying a second union of multiple conditions specified in the original source code upon which the power-consuming resource is released; and
      evaluating a set difference between the first union and the second union, to determine as a resource leak one or more conditions upon which the power-consuming resource is acquired but not released; and
    modifying, by the computing hardware, the original source code by inserting a code portion that releases the power-consuming resource after the task is completed.

11. The computer-implemented method of claim 10, wherein the analyzing and modifying reduces resource leaks caused by the original source code.

12. The computer-implemented method of claim 10, wherein the analyzing comprises:
  generating a data flow graph representative of the original source code; and
  analyzing branches of the data flow graph to identify one or more unreleased power-consuming resources.

13. The computer-implemented method of claim 12, wherein the modifying comprises inserting the code portion that releases the power-consuming resource at a location of the original source code corresponding to a common exit point for two or more branches of the data flow graph, where the two or more branches are identified as having a common unreleased power-consuming resource.

14. The computer-implemented method of claim 12, wherein the modifying comprises restructuring the data flow graph.

15. The computer-implemented method of claim 14, wherein the modifying further comprises modifying affected lines of the original source code based on the restructured data flow graph.

16. The computer-implemented method of claim 10, further comprising iteratively performing, by the computing hardware, the analyzing and modifying as each instance of an unreleased power-consuming resource is identified.

17. The method of claim 10, wherein the application is an application for a smart phone or tablet computer, and wherein the power-consuming resource that is released by the code portion after the task is completed is a transceiver or touch screen of the smart phone or tablet computer.

18. One or more non-transitory computer-readable media storing computer-executable instructions which when executed by a computer cause the computer to perform the method of claim 10.

19. A computer-implemented method comprising:
  inputting, by computing hardware, original source code for an application that invokes operation of one or more power-consuming components;
  analyzing, by the computing hardware, the original source code to identify an instance of a stability redundancy in the original source code, the stability redundancy causing unnecessary processing to be performed during execution of two successive calls to a program object because one or more variables or values acted on by the two successive calls to the program object remain stable between the two successive calls; and
  modifying, by the computing hardware, the original source code to reduce the amount of unnecessary processing performed during the execution of the two successive calls to the program object,
  wherein the modifying comprises, subsequent to the analyzing, inserting one or more code segments into the original source code that create a tracking variable or tracking flag that tracks at runtime whether a respective one of the variables or values has been updated.

20. The method of claim 19, wherein the two successive calls invoke operation of a respective one of the power-consuming components.

21. The method of claim 20, wherein the original source code is for an application to be executed on a smart phone or tablet computer, and wherein the respective one of the power-consuming components is a touch screen or radio transceiver of the smart phone or tablet computer.

22. The method of claim 19, wherein the analyzing comprises:
  unrolling loops from the source code that represents the two successive calls to the program object;
  inlining the unrolled loops; and
  identifying instances of redundant processing from the inlined source code.

23. The method of claim 19, wherein the modifying further comprises inserting code segments into the original source code that bypass one or more operations from the original source code based on the tracking variable or tracking flag.

24. The method of claim 19, wherein the method further comprises:
  prior to the modifying and by the computing hardware, evaluating a memory cost of the modifying; and
  performing the modifying by the computing hardware if the memory cost satisfies a memory cost threshold.

25. One or more non-transitory computer-readable media storing computer-executable instructions which when executed by a computer cause the computer to perform the method of claim 19.

* * * * *